W. W. HERRING.
AGRICULTURAL MACHINERY.
APPLICATION FILED JAN. 10, 1913.
1,190,166.
Patented July 4, 1916.
4 SHEETS—SHEET 1.
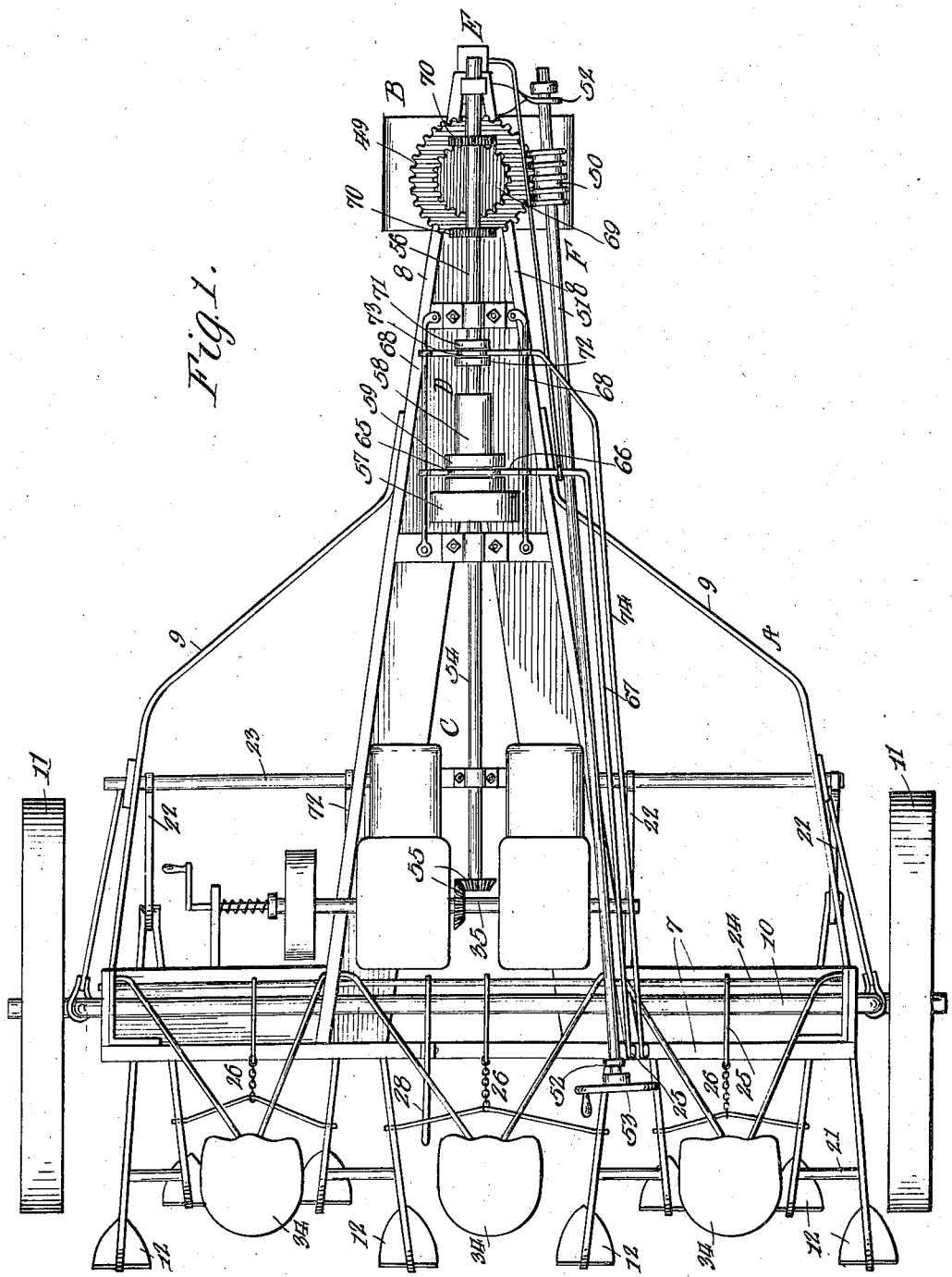
WITNESSES
INVENTOR
William W. Herring,
his Attorney

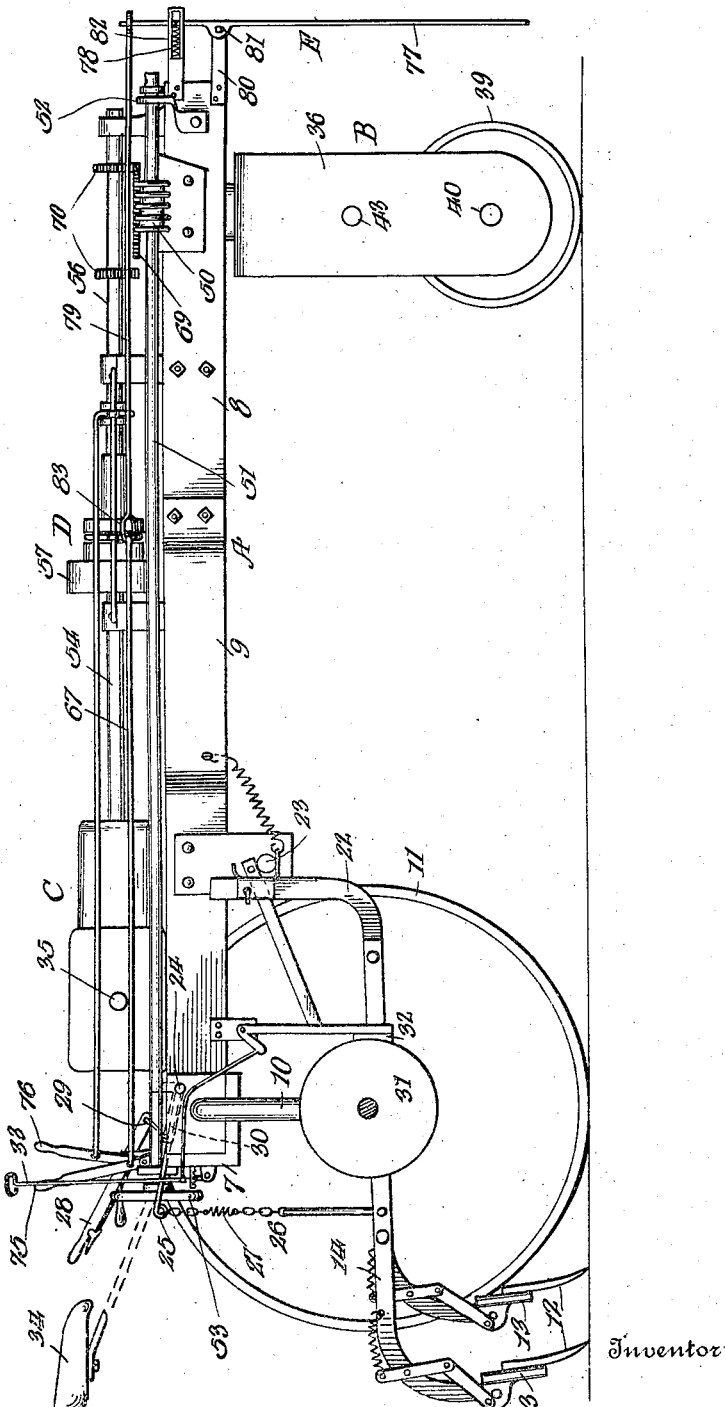

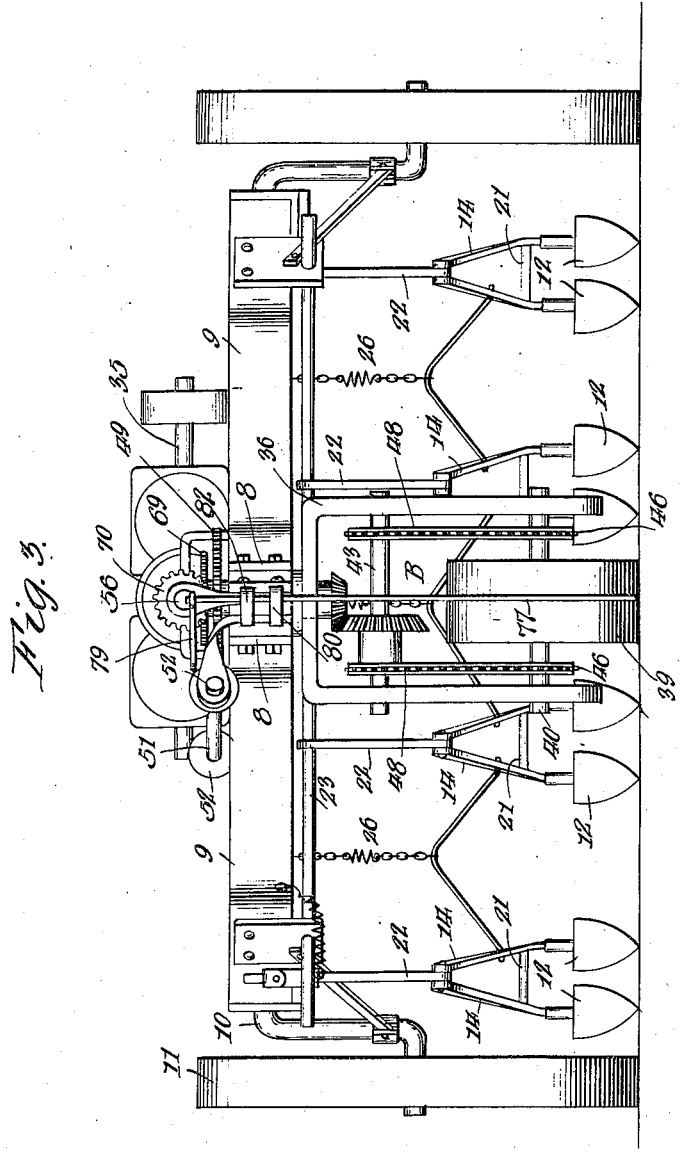

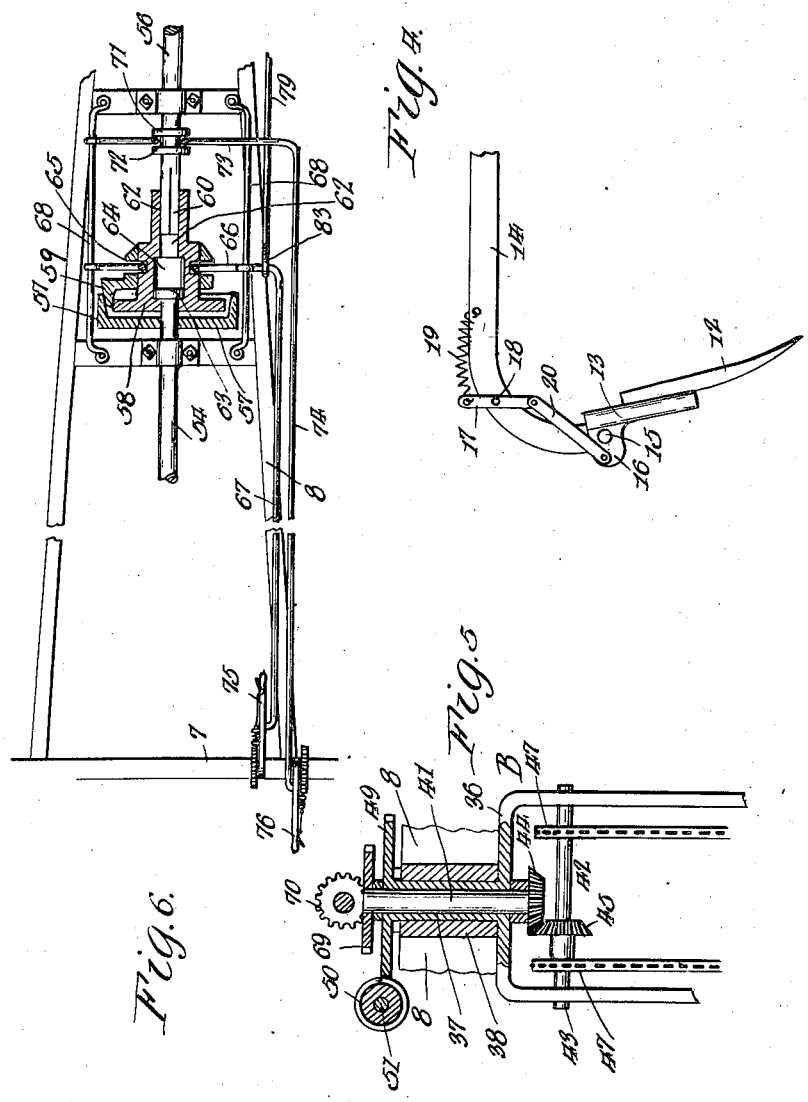

UNITED STATES PATENT OFFICE.

WILLIAM W. HERRING, OF SHAWNEE, OKLAHOMA.

AGRICULTURAL MACHINERY.

1,190,166. Specification of Letters Patent. Patented July 4, 1916.

Application filed January 10, 1913. Serial No. 741,352.

*To all whom it may concern:*

Be it known that I, WILLIAM W. HERRING, a citizen of the United States, residing at Shawnee, in the county of Pottawatomie and State of Oklahoma, have invented new and useful Improvements in Agricultural Machinery, of which the following is a specification.

My present invention relates to agricultural machinery and more particularly applicable for use with that class of machines known as cultivators, carrying a plurality of soil-working implements, and purports to provide a self-propelled vehicle particularly adapted for use in fields where the surface is not as compact as in roadways.

The principal objects of my invention are to provide a simple and efficient chassis for an agricultural machine of the character described; a machine in which one of the wheels of the chassis serves the dual purpose of a drive wheel and steering wheel; to provide simple mechanism whereby the direction of movement of the machine may be reversed at the will of the operator; and, to provide simple and efficient means whereby movement of the machine is quickly stopped upon encountering an obstacle of considerable magnitude.

Other objects of my invention will appear in the following detailed description, taken in connection with the accompanying drawings, forming a part of this specification, and in which drawings:

Figure 1 is a plan view of an agricultural machine embodying my invention. Fig. 2 is a side elevation of the machine embodying my invention, one of the main supporting wheels of the chassis having been removed to disclose details. Fig. 3 is a front elevation of the machine. Fig. 4 is a detail view of one of the soil-working implements, together with its adjacent supporting means, Fig. 5 is a detail view, partly in section and partly in elevation disclosing what I hereinafter term transmission and steering mechanism. Fig. 6 is a view partly in plan and partly in section disclosing what I hereinafter term transmission control mechanism.

In the drawings, where similar characters refer to similar parts, A designates a suitable frame including transverse members 7 and longitudinally extending elongated members 8, preferably symmetrically disposed with respect to the longitudinal axis of the frame, and forming a beam. Brace rods 9 may also be provided rigidly connecting members 7 and 8. Extending longitudinally of members 7, and carried by frame A, is a dead axle 10 supporting wheels 11, which constitute the main supporting wheels of the chassis of the machine. Adjacent the end of the beam formed by members 8, opposite from members 7, I provide transmission and steering mechanism, designated generally by B, and to be subsequently more specifically described.

As disclosed, the machine carries soil-working implements 12, which may be detachably carried by sockets 13, more specifically shown in Fig. 4 of the drawings. I prefer to provide a rearwardly extending arm 14, carried by frame A, for each socket, the latter being oscillatable about a pivot 15, and including an arm 16. Each arm 14 may carry a double armed lever 17, oscillatable about a point 18, one arm of lever 17 receiving a tension spring 19 which is also connected with arm 14. The other arm of lever 17 is connected with arm 16 through link 20. Thus, the soil-working implement 12 is yieldably retained in a forward position, so that it may yield rearwardly on encountering an obstacle of considerable magnitude.

Ties 21 may be provided to connect arms 14 in pairs, and the arms of each pair may be of different lengths so that one soil working implement is in advance of the other. The arms 14 of each pair are preferably connected by a drag arm 22 pendently supported from a shaft 23 rigid with frame A. I also find it desirable to provide a shaft 24, extending longitudinally of axle 10, from which shaft extends, rearwardly, arms 25, which are operatively connected with each adjacent pair of arms 14 through means 26. The means 26 preferably includes a coil spring 27 so that the arms 14 are yieldably and pendently supported from arms 25. Shaft 24 may be actuated by lever 28, operatively connected with said shaft through link 29 and arm 30. Thus, when it is desired to raise the soil-working implements 12, out of operative relation to the soil, the lever 28 is drawn rearwardly. Rotatable with one or both of the wheels 11, I may provide a brake-drum 31 with which a brake shoe 32 may contact, by actuation of lever 33, all as clearly shown in Fig. 2 of the drawings. Carried by frame A in close proximity to levers 28 and 33, I may provide seats 34 for the operators. The frame A carries a motor C, preferably an internal combustion engine, having a drive shaft 35, conveniently disposed with its axis parallel to the axis of axle 10.

Referring now to mechanism B, more specifically shown in Figs. 3 and 5 of the drawings, it comprises a fork 36, having an upright axes of oscillation, as by including an elongated hollow standard 37 received by an elongated bearing sleeve 38 carried at the end of the beam formed by members 8, opposite from wheels 11; a wheel 39 rotatably carried by fork 36 and oscillatable therewith as through axle 40; a shaft 41 coaxial with and extending through the elongated standard 37; and, mechanism 42 for imparting rotation to wheel 39 through shaft 41. The mechanism 42 preferably comprises a shaft 43, carried by fork 36, with its axis parallel to the axis of axle 40; comeshing bevel gears 44 and 45 carried by shafts 41 and 43, respectively; socket wheels 46 rigid with axle 40 and disposed at each side of wheel 39; sprocket wheels 47 rigid with shaft 43, one sprocket 47 for each sprocket 46; and, endless sprocket chains 48, trained about coacting wheels 46 and 47. Thus, mechanism 42 provides positive mechanism for imparting movement of shaft 41 to wheel 39.

Steering means F may be provided to oscillate fork 36, and as disclosed includes a worm gear 49 rigid with the elongated standard 37 and disposed above the elongated bearing sleeve 38; a worm 50 for coaction therewith, a shaft 51 carrying worm 50 and supported by bearing 52; and, a hand wheel 53 facilitating rotation of shaft 51. By this construction, it is to be noted that the fork 36 may oscillate freely about the axis of shaft 41, without affecting the transmission mechanism 42.

The character D designates generally, transmission control mechanism and includes, in combination with a shaft 54, receiving its movement as through comeshing bevel gears 55, from shaft 35, this shaft 35 extending longitudinally of the beam of frame A, and a revoluble and longitudinally movable shaft 56 axially alined with shaft 54; of a clutch member 57 rigid with shaft 54; a coacting clutch member 58, circumferentially movable with shaft 56 but axially movable thereon; and, a wedge member 59 slidable upon clutch member 58, and adapted to impart movement of member 57 to member 58, when engaging the two. The means for coupling member 58 to be circumferentially movable with shaft 56, may be by providing the latter with an end 60 polygonal in cross section, and received by a socket 62 of similar section in member 58. Movement of member 58, in a direction longitudinally of shaft 56 may be limited by providing a head 63 on shaft 54, said head being received by recess 64 in member 58.

As means for moving wedge member 59 into and out of engagement with clutch members 57 and 58, I provide a circumferentially extending groove 65 in member 58, which groove receives an angle extension 66 of a rod 67 extending in close proximity to seats 34. The angle extension 66 may be guided by embracing parallel rods 68, in parallelism to coaxial shafts 54 and 56. Thus, by drawing rod 67 toward the operator, the wedge member 59 is so disposed that circumferential movement of member 57 is imparted to member 58, and consequently to shaft 56.

The shaft 41 of mechanism B carries a gear 69, while shaft 56, which is disposed with its axis transversely with respect to the axis of shaft 41, carries gears 70, either of which may comesh with gear 69 to impart movement of shaft 56 to shaft 41. With this end in view, the shaft 56 is reciprocable, and may carry a collar 71 rigid therewith provided with an annular groove 72. The embracing portions 73 of a rod 74 may extend into groove 72, these embracing portions being guided by rods 68. The rods 67 and 74 may be independently connected to levers 75 and 76, respectively, disposed in close proximity to the operators' seats 34. Thus, by oscillating lever 76, the shaft 56 may be retained against longitudinal movement with either of the gears 70 meshing with gear 69, according to the direction of rotation it is desired to impart to wheel 39.

Referring now to the auxiliary or safety control mechanism for the transmission, designated generally by E, it comprises a member 77, disposed at the front end of the machine chassis and normally projected as by tension spring 78; and, a rod 79, operatively connecting member 77 with angle extension 66, so that when member 77 is moved from a normal position, this extension throws wedge member 59 out of contact with coacting clutch members 57 and 68. The member 77 may consist in a rod pivoted to the frame beam, as by bracket 80, intermediate its length, as at 81. The upper end of this rod extends through a guide-bracket 82, accommodating spring 78 so that this spring has a tendency to draw the upper end of the rod toward mechanism D.

The rod 79 is pivoted to the upper end of member 77, and is preferably looped about the extension 66 as at 83, so as to not interfere with free movement of said extension through actuation of rod 67. It is to be noted that, when member 77 encounters an obstacle of considerable magnitude, the rod 79 is drawn forwardly so that mechanism D is rendered inactive with motion transmitting means.

The operation of the machine is as follows: Assuming that the motor C has been put into action, the shaft 54 is revolved; by manipulation of lever 76, the shaft 56 may be retained against longitudinal movement so that one of its gears 70 comesh with gear 69, according to the direction of movement it is desired to impart to the chassis. By manipulating lever 75, the wedge member 59 may be actuated to couple members 57 and 58, so that circumferential movement is imparted to shaft 56, whereupon the wheel 39 is rotated. By manipulation of hand wheel 53, the worm 50 may be rotated to oscillate the fork 36 about its upright axis, thereby steering the machine.

Changes in details may be made without departing from the spirit or scope of my invention; but,

I claim:—

1. A chassis for agricultural machines comprising in combination, a frame including a longitudinally extending beam, an elongated bearing sleeve rigid with said beam and disposed with the axis of its bore upright, wheels for supporting said frame adjacent one end of said beam, a fork including an elongated hollow standard extending through the bore of said bearing sleeve to permit oscillation of said fork about an upright axis, a wheel revolubly carried by said fork supporting said frame adjacent its end opposite from said first mentioned wheels, a shaft coaxial with and extending through the said standard of said fork, a motor carried by said frame, means for rotating said shaft from said motor, means for imparting movement of said shaft to said wheel of said fork, and means operatively connected with said hollow elongated standard of said fork for oscillating the same, substantially as and for the purpose set forth.

2. A chassis for agricultural machines comprising in combination, a frame including a longitudinally extending beam, an elongated bearing sleeve rigid with said beam and disposed with the axis af its bore upright, ground wheels for supporting said frame adjacent one end of said beam, a fork including an elongated hollow standard extending through said bore of said bearing sleeve to permit oscillation of said fork about an upright axis, a wheel revolubly carried by said fork supporting said frame adjacent its end opposite from said first mentioned wheels, a shaft coaxial with and extending through the said standard of said fork, a motor carried by said frame, a second wheel rigid with said shaft and disposed above said bearing sleeve, means for rotating said second wheel by action of said motor, a third wheel, intermediate said second wheel and bearing sleeve, and rigid with the said hollow standard of said fork, and means for imparting movement to said third wheel in either direction.

3. A chassis for agricultural machines comprising in combination, a frame including a longitudinally extending beam, an elongated bearing sleeve rigid with said beam and disposed with the axis of its bore upright, ground wheels for supporting said frame adjacent one end of said beam, a fork including an elongated hollow standard extending through said bore of said bearing sleeve to permit oscillation of said fork about an upright axis, a wheel revolubly carried by said fork supporting said frame adjacent its end opposite from said first mentioned wheels, a shaft coaxial with and extending through the said standard of said fork, a motor carried by said frame, a second wheel rigid with said shaft and disposed above said bearing sleeve, means for rotating said second wheel by action of said motor, a worm wheel relatively greater in diameter than said second mentioned wheel disposed intermediate the same and said bearing sleeve, and rigid with said hollow standard of said fork, a worm co-meshing with said worm wheel, and means for imparting movement to said worm wheel in either direction.

4. A chassis for agricultural machines including a frame having a narrowed forward portion and a widened rearward portion, the rearward portion of said frame being provided with a dead axle having a plurality of supporting wheels, driving mechanism including a prime mover located adjacent said rearward portion of the frame and thereby providing a preponderance of weight over said dead axle, said driving mechanism including a forward driving and steering wheel located at the narrowed portion of said frame.

5. An agricultural machine including a frame provided with a dead rear axle having supporting wheels, a prime mover and soil treating means located adjacent and on either side of said axle to provide a preponderance of weight over said axle, forward driving and steering means, and power transmission mechanism connecting said prime mover with said driving and steering means.

6. An agricultural machine including an elongated frame provided with a dead rear axle carrying a plurality of supporting wheels, a prime mover and soil treating means located adjacent and on either side of said rear axle to provide a preponderance of weight over said axle, steering means located forwardly of said frame and including a traction wheel having a traction surface equal to substantially twice the width of the surface of said supporting wheels, and means connecting said traction wheel with said prime mover to impart driving power to the former.

WILLIAM W. HERRING.

Witnesses:
C. L. MARTIN,
L. C. ELSTON.